United States Patent
Bocharov et al.

(10) Patent No.: US 9,811,885 B2
(45) Date of Patent: *Nov. 7, 2017

(54) DETECTING GLARE IN A FRAME OF IMAGE DATA

(71) Applicant: ABBYY Development LLC, Moscow (RU)

(72) Inventors: Konstantin Bocharov, Moscow (RU); Mikhail Kostyukov, Moscow (RU)

(73) Assignee: ABBYY DEVELOPMENT LLC, Moscow (RU)

( * ) Notice: Subject to any disclaimer, the term of this patent is extended or adjusted under 35 U.S.C. 154(b) by 0 days.

This patent is subject to a terminal disclaimer.

(21) Appl. No.: 15/228,458

(22) Filed: Aug. 4, 2016

(65) Prior Publication Data

US 2017/0039684 A1 Feb. 9, 2017

Related U.S. Application Data

(63) Continuation of application No. 14/564,424, filed on Dec. 9, 2014, now Pat. No. 9,418,407, which is a continuation-in-part of application No. 13/305,768, filed on Nov. 29, 2011, now Pat. No. 8,928,763, which is a continuation-in-part of application No. 12/330,771, filed on Dec. 9, 2008, now Pat. No. 8,098,303.

(51) Int. Cl.
| | |
|---|---|
| G06T 5/00 | (2006.01) |
| G06K 9/40 | (2006.01) |
| G06K 9/46 | (2006.01) |
| G06K 9/52 | (2006.01) |

(52) U.S. Cl.
CPC ............ *G06T 5/002* (2013.01); *G06K 9/40* (2013.01); *G06K 9/4642* (2013.01); *G06K 9/522* (2013.01); *G06T 5/003* (2013.01); *G06T 5/005* (2013.01); *G06T 2207/20021* (2013.01); *G06T 2207/20024* (2013.01); *G06T 2207/20056* (2013.01); *G06T 2207/20201* (2013.01)

(58) Field of Classification Search
CPC ..................................................... G06K 9/46
See application file for complete search history.

(56) References Cited

U.S. PATENT DOCUMENTS

| 9,418,407 | B2* | 8/2016 | Bocharov | G06T 5/005 |
| 2006/0008122 | A1* | 1/2006 | Kurzweil | G06K 9/228 |
| | | | | 382/114 |
| 2013/0329073 | A1* | 12/2013 | Majewicz | H04N 1/387 |
| | | | | 348/222.1 |
| 2014/0270528 | A1* | 9/2014 | Ramos | G06T 5/001 |
| | | | | 382/182 |
| 2015/0254507 | A1* | 9/2015 | Lin | G06K 9/18 |
| | | | | 382/176 |

* cited by examiner

*Primary Examiner* — James Hannett
(74) *Attorney, Agent, or Firm* — Lowenstein Sandler LLP

(57) ABSTRACT

Disclosed are systems, computer-readable mediums, and methods for detecting glare in a frame of image data. A frame of image data is preprocessed. A set of connected components in the preprocessed frame is determined. A set of statistics is calculated for one or more connected components in the set of connected components. A decision for the one or more connected components is made, using the calculated set of statistics, if the connected component is a light spot over text. Whether glare is present in the frame is determined.

37 Claims, 12 Drawing Sheets

402

401

DETECTING GLARE IN A FRAME OF IMAGE DATA

CROSS REFERENCE TO RELATED APPLICATIONS

This application is a continuation of U.S. patent application Ser. No. 14/564,424, filed Dec. 9, 2014 which will issue as U.S. Pat. No. 9,418,407 on Aug. 16, 2016 which is a continuation-in-part of U.S. patent application Ser. No. 13/305,768, filed Nov. 29, 2011, now U.S. Pat. No. 8,928,763, issued Jan. 6, 2015 which is a continuation-in-part of U.S. patent application Ser. No. 12/330,771, filed Dec. 9, 2008, now U.S. Pat. No. 8,098,303, issued Jan. 17, 2012. This application also claims the benefit of priority to Russian patent application No. 2014101665, filed Jan. 21, 2014; disclosures of the priority applications are herein incorporated by reference.

BACKGROUND

Various mobile devices include a built-in camera. Pictures taken with mobile devices can include various defects, such as, blurred areas, fuzzy or unfocused areas, areas with glare, etc. Prior to taking a picture of a scene, the scene can be shown in a viewfinder. Determining when to capture an image to minimize defects can be a problem. Defects in captured images may be caused by one or more various reasons such as: limited resolution of the camera matrix, issues in the optical system of the electronic device, data encryption algorithms, and insensitive or crude compression algorithms. The imperfections in the use of a mobile camera such as hands shakes or non-ideal light conditions may also cause defects in captured images. Such defects can include optical distortions, blur caused by limited shutter speed, noise, smoothing effect, defocusing, aliasing effects, glare in images etc. These defects can negatively impact the processing of the captured image.

SUMMARY

Disclosed are systems, computer-readable mediums, and methods for detecting glare in a frame of image data. A frame of image data is preprocessed. A set of connected components in the preprocessed frame is determined. A set of statistics is calculated for one or more connected components in the set of connected components. A decision for the one or more connected components is made, using the calculated set of statistics, if the connected component is a light spot over text. Whether glare is present in the frame is determined.

Described herein systems, computer-readable mediums, and methods for performing preliminary analysis of image data, such as a frame (current view or scene) on a display screen of a viewfinder, before capturing an image, and controlling the generation of images with a camera, such as those built into portable electronic devices. In various embodiments, results of preliminary analysis of a frame are displayed as visual signals on a screen in real time. These visual signals can help substantially simplify the process of capturing and to improve the quality of captured images.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are; therefore, not to be considered limiting of its scope, the disclosure will be described with additional specificity and detail through use of the accompanying drawings.

Figure 1A:
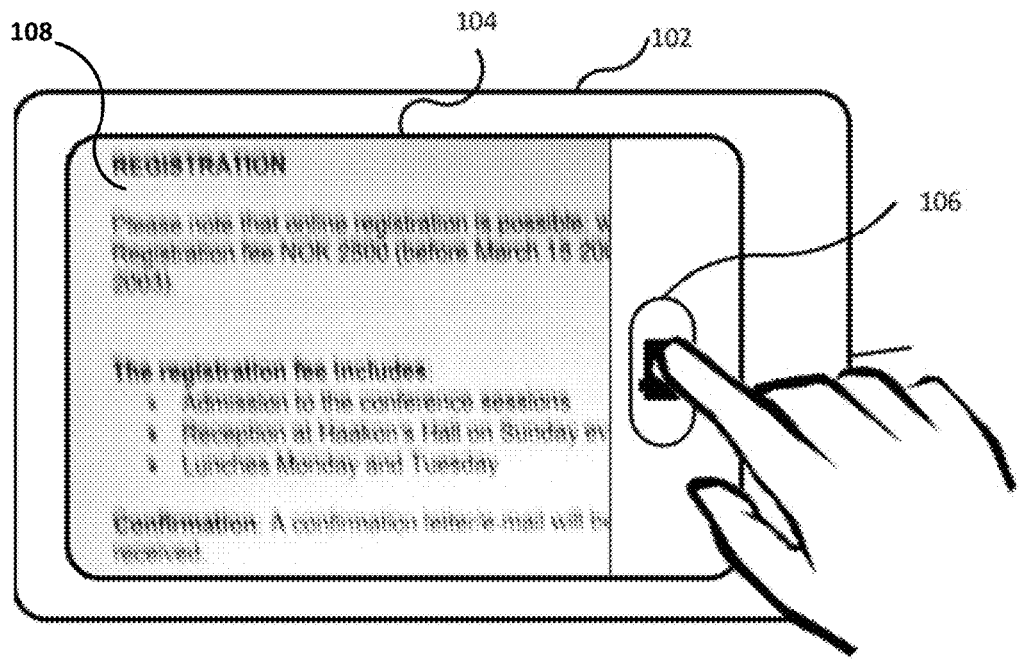
FIG. 1A shows an exemplary screen of an electronic device that contains a frame with blur in a viewfinder in accordance with an embodiment of the present disclosure.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Implementations of various disclosed embodiments relate to analyzing a frame of image data to find defects. The frame can be image data shown in a viewfinder. The detected defects can be analyzed before the image is obtained by a user. Evaluation of the frame for defects can be used to avoid shooting images unsuitable or poorly suitable for recognition. The preliminary results of defects detection can be displayed directly on the screen of a mobile device in order to improve the conditions of shooting for higher picture quality. For example, defects can be visually highlighted or user prompts that include information regarding detected defects can be presented on the mobile device.

In another embodiment, analysis of a frame of a depicted scene on a screen of a viewfinder of an electronic device is performed. The display of a frame on a screen of a mobile device can be performed in real time without recording a video or capturing the image and storing it in the memory of the electronic device. The analysis can be performed on multiple frames and the frame containing the least amount of noise and defects can be determined. This frame can be displayed along with the results of defects detection in the form of visual signals. Accordingly, blur, defocus and glare can be detected and the areas with defects shown on the electronic device.

In another embodiment, the capture of an image shown in the frame can be automatically performed if the level of defects within the frame does not exceed a threshold value. Accordingly, preliminary analysis of the frame based upon data received by lens of camera application can be used to determine when to capture the image of the scene shown in the frame.

In the following description, the term "frame" refers to a content, e.g., an image, displayed on the screen of an electronic device produced using the camera viewfinder. The frame can be transmitted in real time without recording video or capturing/storing the image in long term memory.

There is a plethora of portable electronic devices with display screens capable of displaying text and/or images. These portable devices typically include a camera which allows these devices to capture images. Devices with a display screen and/or touch screen and a camera include many mobile devices, such as laptops, tablet computers, smartphones, mobile phones, personal digital assistants (PDAs), etc. Various embodiments facilitate the capturing or shooting a document containing text automatically if the level of defects within the frame does not exceed a threshold value.

FIG. 1A shows an exemplary screen of an electronic device 102 that contains a frame 108 with blur in a viewfinder in accordance with an embodiment of the present disclosure. The electronic device 102 comprises a display screen 104 and camera button 106 for triggering, making or shooting an image with a camera (not shown) that is part of the electronic device. The button 106 may be software-generated (virtual) or actual (e.g., physical button associated with the chassis of the electronic device 102). A frame 108 of content presented on the display screen 104 can be captured by a viewfinder of camera application that sends a frame of a subject of the content to the display screen 104.

Figure 1B:
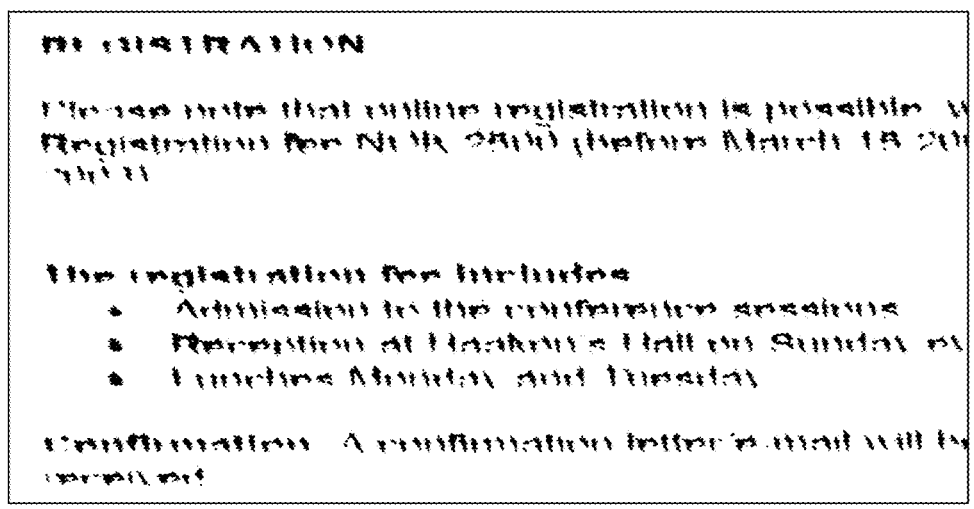
FIG. 1B shows the frame shown in FIG. 1A after being binarized in accordance with an embodiment of the present disclosure.

The frame 108 can represent a signal, registered by optical systems (Analog-to-digital converter, ADC) and displayed on the screen of the electronic device 102. Some electronic devices can display the frame in real time without performing a capturing an image. In FIG. 1A, the frame 108 on the screen has a defect, i.e., the text is blurred. Text with defects, such as the blurring shown in FIG. 1A, can make image processing tasks, such as edge detection, optical character recognition, etc., difficult. As an example, the result of binarization of the text fragment of the frame in FIG. 1A is shown in FIG. 1B.

Detection of boundaries of objects is a versatile tool in image processing and can be applied not only to the recognition systems, but also in other image processing applications, such as scanning systems, cameras, control systems, the print quality of a robot, etc.

Characteristics of algorithms used to detect blur and defocusing can include:
  reliable detection of degraded areas;
  efficient or high performance;
  resistance to high levels of noise (common in mobile devices);
  resistance to uneven lighting, very bright lighting and poor lighting; and
  resistance to histogram manipulations, such as equalization.

The above characteristics can make the task of blur detection in every scenario very difficult. One way to simplify the task is to narrow down the class of images processed to those that include certain types of object. For example, images that include cells or bacteria, textured objects, text, barcode images, or light and shadow. If the type of object to be expected in an image is known in advance, embodiments can identify not only the typical features of the objects themselves, but also the typical features of the blur on these objects. But even with the class of images narrowed down, the task of blur detection can remain very difficult because of high-performance and noise resistance characteristics.

One or more of the following features can be used to determine the presence of blur and defocusing within a frame of image data:
  features in the frequency domain;
  features in the histogram of gradient;
  the lack of saturated colors;
  features in the distribution of boundaries in the directions; and
  local correlation (blur the boundaries of parallel motion).
Individual features or combinations thereof can be used to find the type and areas of distortions in images.

The ability to detect boundaries in images with distortions depends on the degree of these distortions, and the relative size and contrast of information items within the image. Thus, the small or low contrast letters can be almost unreadable even with low blur, while large or high-contrast letters can remain legible at the same (or even larger) degree of blur. As described in greater detail below, the relative size and contrast of information items can be taken into account when determining defects and areas of those defects.

In addition to detecting defects or distortions in an image, detecting a degree of distortion is useful. Also, determining the type of distortion, e.g., blur, defocusing or glare, can also be useful. A type of distortion in one or more areas can be determined by extrapolating the information from neighboring regions.

In one embodiment, a button on the mobile device can be actuated to trigger capture of an electronic image. Rather than simply capturing the image based upon the button, the frame can be analyzed to determine if the amount of distortion does not exceed a predetermined threshold. After the button is actuated, analysis of the frame can begin. The button 106 shown in FIG. 1A is an example of the button than can start the analysis process.

Viewfinders of devices can provide real time image data that is displayed on the screen. The defect analysis can be done for each frame or can be done on a subset of frames received from the viewfinder. For example, the frame can be selected from every ten frames/views received from the viewfinder. Other frequencies are possible such as every 2, 4, 6, 100, or 200 frames can be used. Each frame or each selected frame can be analyzed to identify one or more of blur, defocusing, glare or noise defects. Selecting and analyzing a frame can be performed without interrupting display of the image data on the viewfinder.

Detecting Blur and Defocusing

According to various embodiments a Laplacian filter can be used for blur and defocusing detection. The conclusions about blur or defocusing within the frame may be made based on analysis of results of the second derivatives of the frame's brightness in the neighborhood of zero crossing points. If an area contains objects with contrasting edges, the zero crossing points are well detected. In the opposite case, the absence of objects with contrasting edges indicates a high noise level or a strong degree of blur.

In one embodiment, the second-order method is used to detect object edges. Common examples of this method involve a LoG filter (the Laplacian of the Gaussian) and a DoG filter (the Difference of Gaussians).

The filter applying can be efficiently computed in linear time based on the number of pixels within a frame. In case of the Laplace approximation, using the second derivative in a given direction of brightness function provides a cut of the Laplacian like image passing through the pixel along this direction. This approximation in the neighborhood of the analyzed point will be called a point profile.

Parameters selection for DoG or LoG filtering can take into account features of a class of images and features of a camera structure to detect presence of distortions at known parameters of noise and characteristics of objects within the frame.

A LoG filter first applies a Gaussian smoothing, then applies the Laplacian filter. A DoG filter is the subtraction of two Gaussian smoothed images obtained by convolving the original image with Gaussian functions having different degrees of smoothing (standard deviation). To set up the filters, parameter $\sigma_1$ and $\sigma_2$ (standard deviation) of the Gaussian smoothing is used:

$$gs_1(x, y) = \frac{1}{2\pi\sigma^2} e^{\frac{x^2+y^2}{2\sigma_1^2}},$$

$$gs_2(x, y) = \frac{1}{2\pi\sigma^2} e^{\frac{x^2+y^2}{2\sigma_2^2}}.$$

Then zero crossing checking can be performed (i.e., when the resulting value goes from negative to positive or vice versa). The result of applying these filters is an image with the edges of the original image.

In order to detect blur and defocusing, only the edges of the objects can be analyzed instead of the entire image. Broad classes of images will have objects with well-defined edges in all directions. Such defects as blur and defocusing typically result in degradation of these well-defined edges into less sharp edges.

There are step changes in brightness at the objects edges in many frames. In the case of undistorted images, these are sharp changes in brightness at the objects edges. The cut of ideal image of a document is close to the "step". To get close to the function of a piecewise constant, or a step function, all of the images can be cut through. However, due to imperfections in recording systems, the consequences of sampling and other processes, the step function is eroded and superimposed with noise. For images with negligible distortion of text edges, however, abrupt changes in brightness can be detected and/or distinguished.

After light passes through an optical system and images are registered on a photographic sensor, various distortions of the original image can occur, such as uneven lighting, blur, defocusing, and noise. Additional distortions can be introduced when the image is post-processed and compressed (e.g., by using a JPEG or other lossy compression that yields JPEG artifacts). The edges of the objects are also affected by all of the above types of distortion. Therefore, instead of a sharp change in brightness at the edges of objects, there is a gradual change in brightness compounded by noise. By analyzing the brightness profile at the edges, presence of one or another distortion may be presumed and strength of image degradation may be identified.

Figure 2:
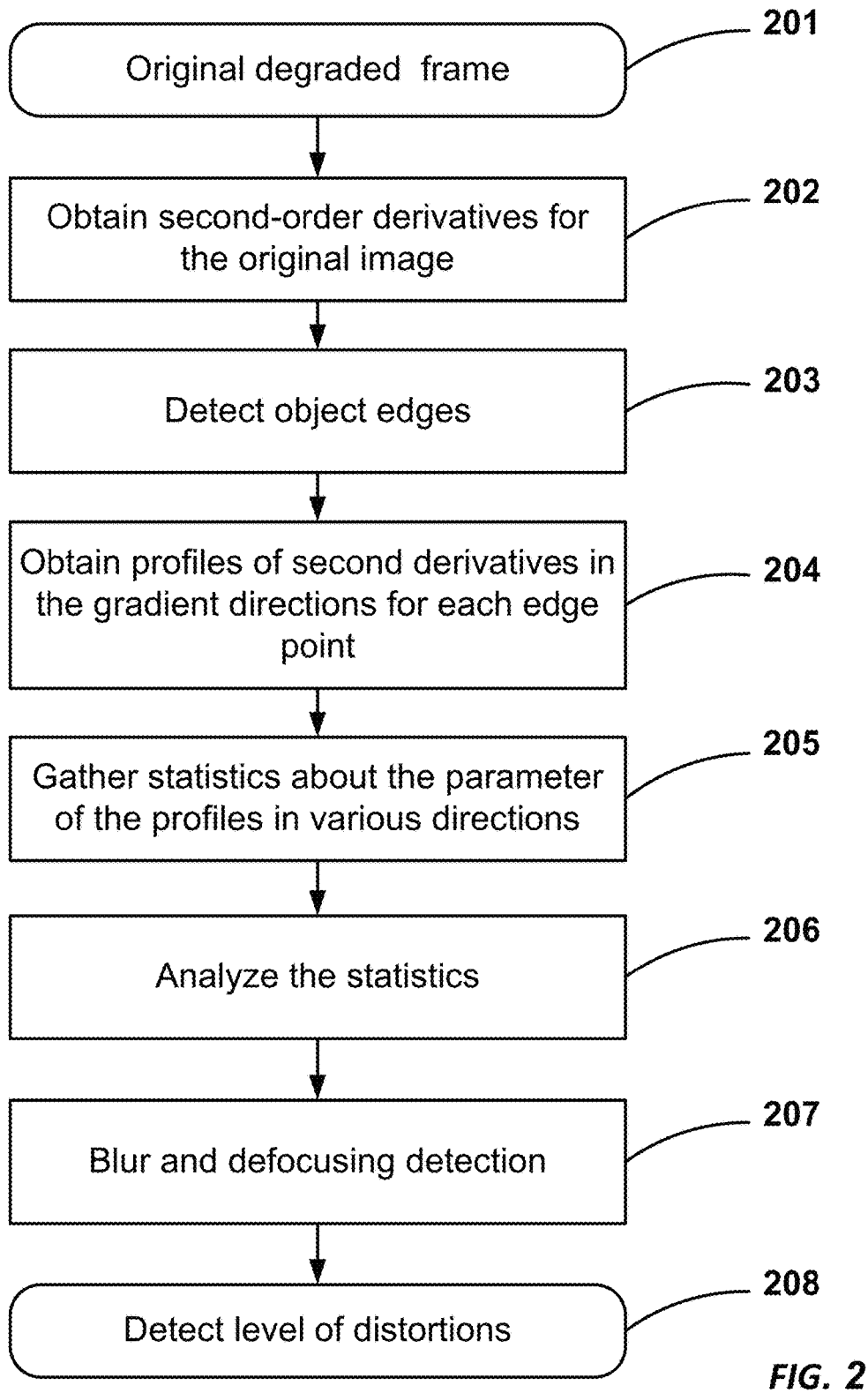
FIG. 2 shows operations for detecting blur and defocusing in accordance with an embodiment of the present disclosure.

With reference to FIG. 2, presumptions about blur and defocusing of the original image (201) are based on the second derivatives of the image brightness (202). First, object edges are detected (203), and then for points on the edges, profiles of second derivative are obtained in the direction of the gradient (204), and statistics are gathered about the parameters of these profiles in various directions (205). By analyzing the statistics (206), distortions in the image and their type (e.g., blur and defocusing), the strength of distortion, the direction of the blur, etc. are detected (207). In addition, the degree of distortion of the image can also be determined based in part on the statistics (208).

At operation 202, in order to obtain the second-order derivatives for the original image (201), any Laplacian filter, or any approximation of a Laplacian filter, can be applied. To reduce the effect of noise, the image can first be smoothed, for which purpose Gaussian smoothing or any other smoothing method may be used, e.g. median filter, box-filter, adaptive median filter, etc. Also, transformations may be used which include both filters, such as LoG (the Laplacian of the Gaussian) filtering and DoG (the Difference of Gaussians) filtering.

Figure 4A:
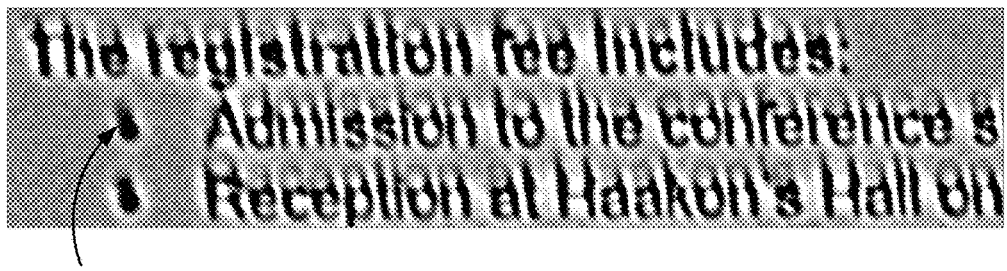
FIG. 4A shows an example Laplacian-like image derived from the frame shown in FIG. 1A in accordance with an embodiment of the present disclosure.

A smoothed original image to which a Laplacian filter or its approximation has been applied is hereafter termed Laplacian-like image. An example of Laplacian-like image of the fragment is represented in FIG. 4A. The type of filter (i.e., the smoothing and approximation methods) and the filtering parameters (e.g., standard deviation of Gaussian smoothing) may be selected so as to take into account typical characteristics of a given class of images or a photographic device to best detect defects on the image.

Figure 4B:
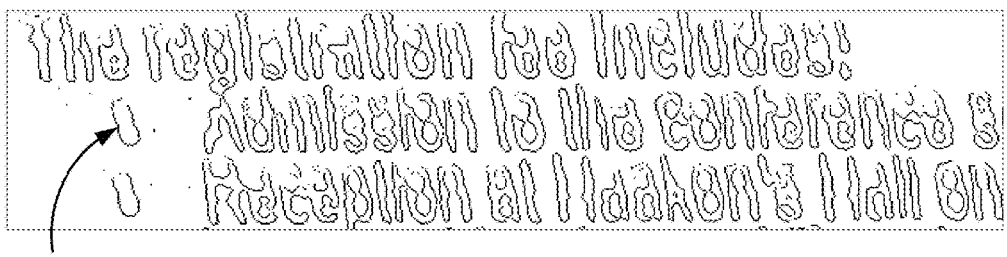
FIG. 4B shows object edges for the frame shown in FIG. 1A obtained from the Laplacian-like image shown in FIG. 4A by applying zero-crossing filtering in accordance with an embodiment of the present disclosure.

At operation 203, a zero-crossing filter is applied to the Laplacian-like image and is shown in FIG. 4B. As a result of this filtering, one-pixel-thick edges are identified on the image. As a result of this operation, false edges may be identified. False edges usually occur because of high levels of noise. In order to reduce the occurrence of false edges, a zero-crossing threshold is specified. This threshold sets the minimum jump in brightness between the adjacent or close pixels on the Laplacian-like image, when the zero-cross point is assumed to be an edge. The threshold can be computed from the parameters of the performed smoothing and by assessing the levels of noise on the input image (e.g., by assessing the noise dispersion). The threshold may also be selected experimentally. In some cases, information about the noise may be available in advance. For example, some photographic cameras can provide noise assessments based on the camera settings used.

At operation 204, for each point on the edges thus obtained (as shown in FIG. 4B), a direction of gradient is found in the corresponding points on the Laplacian-like image (shown in FIG. 4A) and a profile of second derivative in the direction of the gradient is obtained.

Figure 5A:
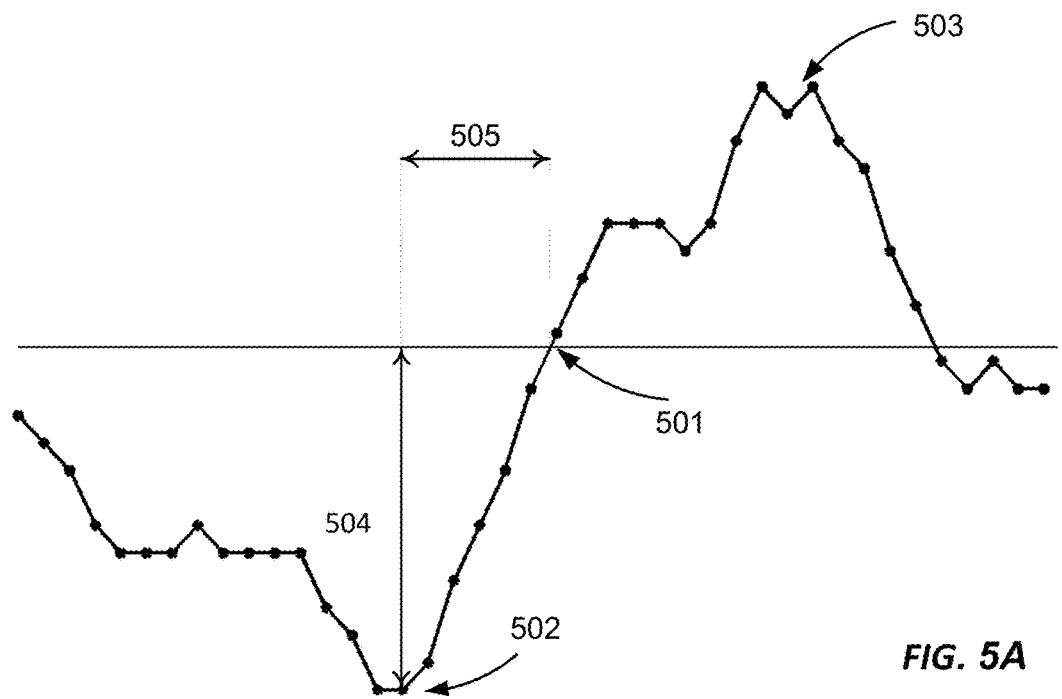
FIG. 5A shows a profile of second derivative in the gradient direction for point 402 of FIG. 4A in accordance with an embodiment of the present disclosure.

Next, local extrema (e.g., points 502 and 503 shown in FIG. 5A) are found for the profiles and information is gathered about absolute values of the extrema and distances from the extrema to the corresponding zero crossing point (termed "extremum offset"). For example, in FIG. 5A the absolute value 504 of extremum 502 and its extremum offset 505 are shown, where point 501 is a zero crossing point. Other parameters of the profile may also be used. At operation 205 of FIG. 2, the above information is gathered separately for maximum and minimum extrema and separately for the different directions of the gradient.

In one embodiment, to make the gathering of the statistics (e.g., operation 205 in FIG. 2) and further analysis (e.g., operation 206 in FIG. 2) simpler, the direction of the gradient may be quantized (e.g., at an angle of 45 degrees) before the profile is created. In this case, the statistics are gathered separately for each of the eight directions that have been specified.

Additionally, for each extremum its reliability may be recorded in order to exclude unreliable extrema from the statistics. A local extremum may be assumed to be unreliable if its position may not be reliably detected, for example, when it is considerably stretched or there are two or more local spikes nearby. A large share of unreliable extrema may be a sign of a considerable strength of image distortion. For example in FIG. 5A, the extremum 503 may be marked as unreliable.

The whole image may be segmented into non-overlapping areas of any shape. Statistics are gathered within each of the areas. Segmentation into areas makes it possible to take into account possible variations in blur and others defects direction in different areas. The direction of blur may vary, for example, due to rotation of a camera in the moment of shooting, or a part of an image may be out of focus when photographs are taken at close distances. Additionally, connected components of the edges may be selected as areas, each connected component being a separate object or object part. This approach allows detecting blur and defocusing separately for each object within a frame, which makes it possible to use detector, for example, for detecting moving objects against a static background.

Segmenting a frame into non-overlapping regions may be used as one of possible instruments intended for transmitting a visual signal to a user about the presence of defects within the frame, at least within one of the areas in the screen of a viewfinder. For example, areas of a frame in the screen of a viewfinder, which contain one of possible defects, may be filled with a certain color. The intensity of coloring may correlate with (correspond to) degree of distortion within the area.

Figure 9B:
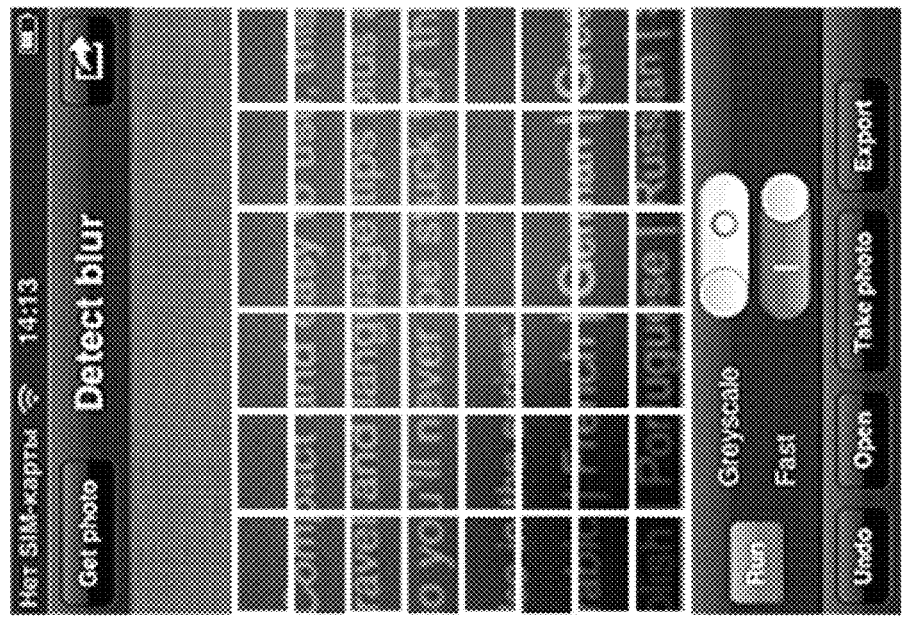
FIGS. 9A, 9B, and 9C show screenshots that include a rectangular grid for indicating defects in accordance with an embodiment of the present disclosure.
Figure 9A:
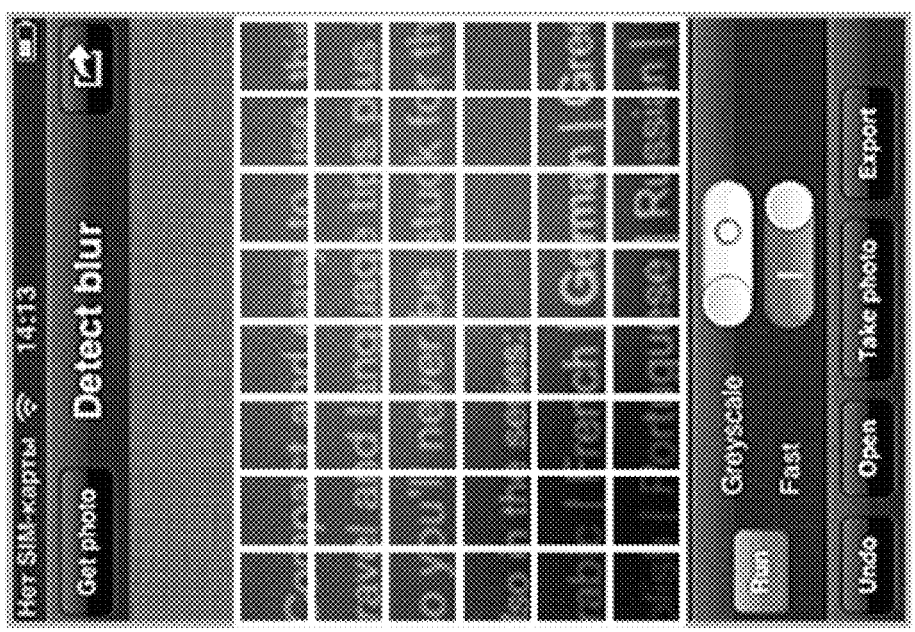
Figure 10:
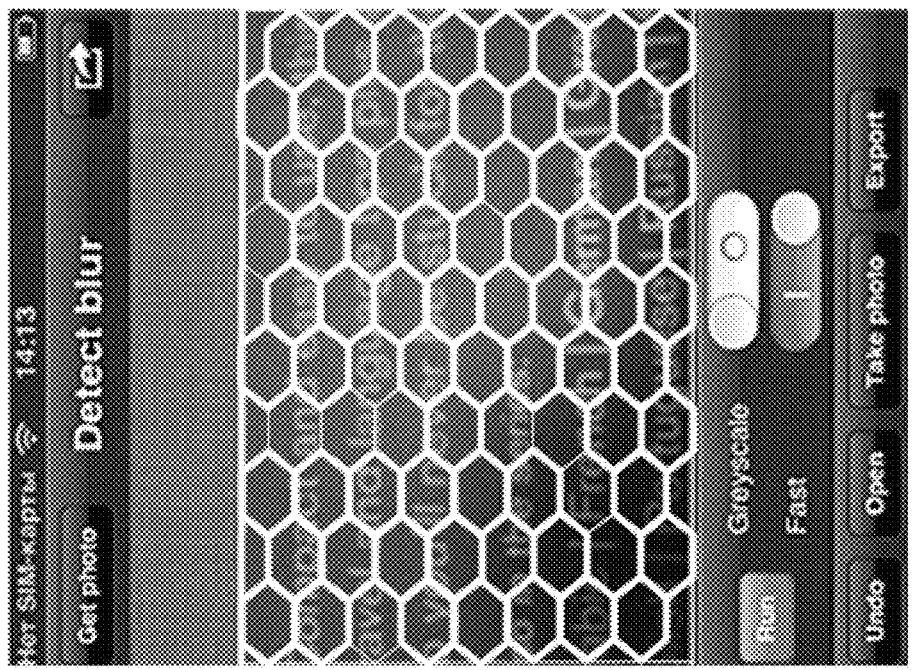
FIG. 10 shows a screenshot that includes a hexagonal grid for indicating defects in accordance with an embodiment of the present disclosure.
Figure 9C:
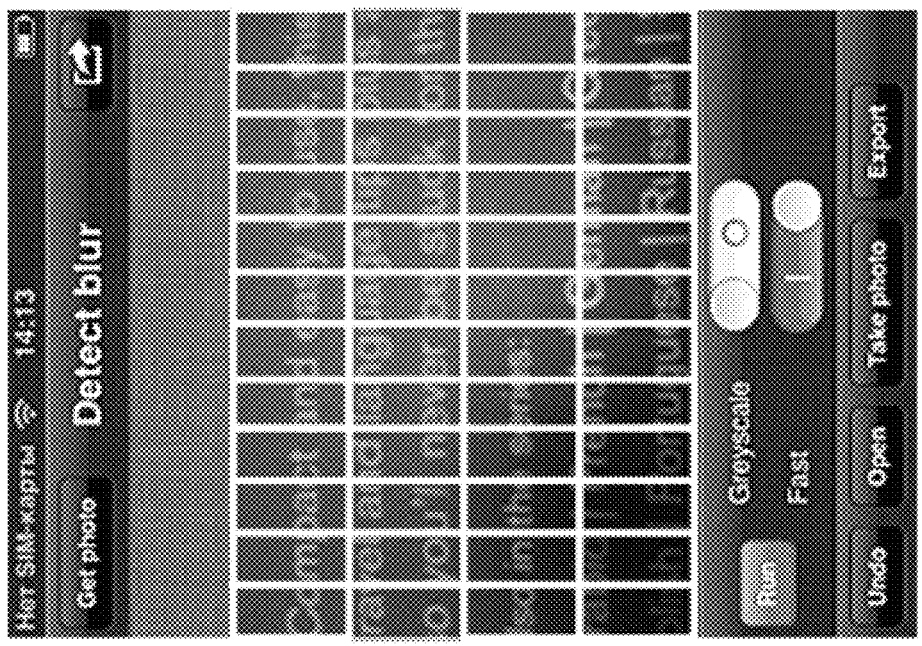

The grid of non-overlapping regions may be represented in various designs and shapes. For example, the grid of non-overlapping regions may be represented in form of square regions (as shown in FIG. 9A) or rectangle regions (as shown FIG. 9B and FIG. 9C). Other shapes can be used to construct the grids, for example, rhombs, parallelograms or possible quadrangles can be used. The shape of the regions is not limited by quadrangles. Any possible geometric figures may be used for grid regions. In one embodiment the regions are represented as hexagons such that the grid resembles a honeycomb. The example of grid in a form of honeycomb is illustrated in FIG. 10. Additionally geometric shapes may be rotated to some angle, for example to 30, 45, 60 or 90 grades (FIG. 9C). The grid may include figures of different shapes, for example it may consist of squares and rectangles, etc. The main goal of the region is dividing the frame into several parts, so the dividing may be performed in a manner that is convenient for a certain electronic device, for certain defect detection, or for a certain user. Moreover the type of the grid may be selected by user in the setting or the type of the grid may be default. In an alternative embodiment, the grid may be transparent. The percentage of transparency may be selected in the settings; it may change from absolutely transparency to absolutely non-transparency.

Figures 11A, 11B:
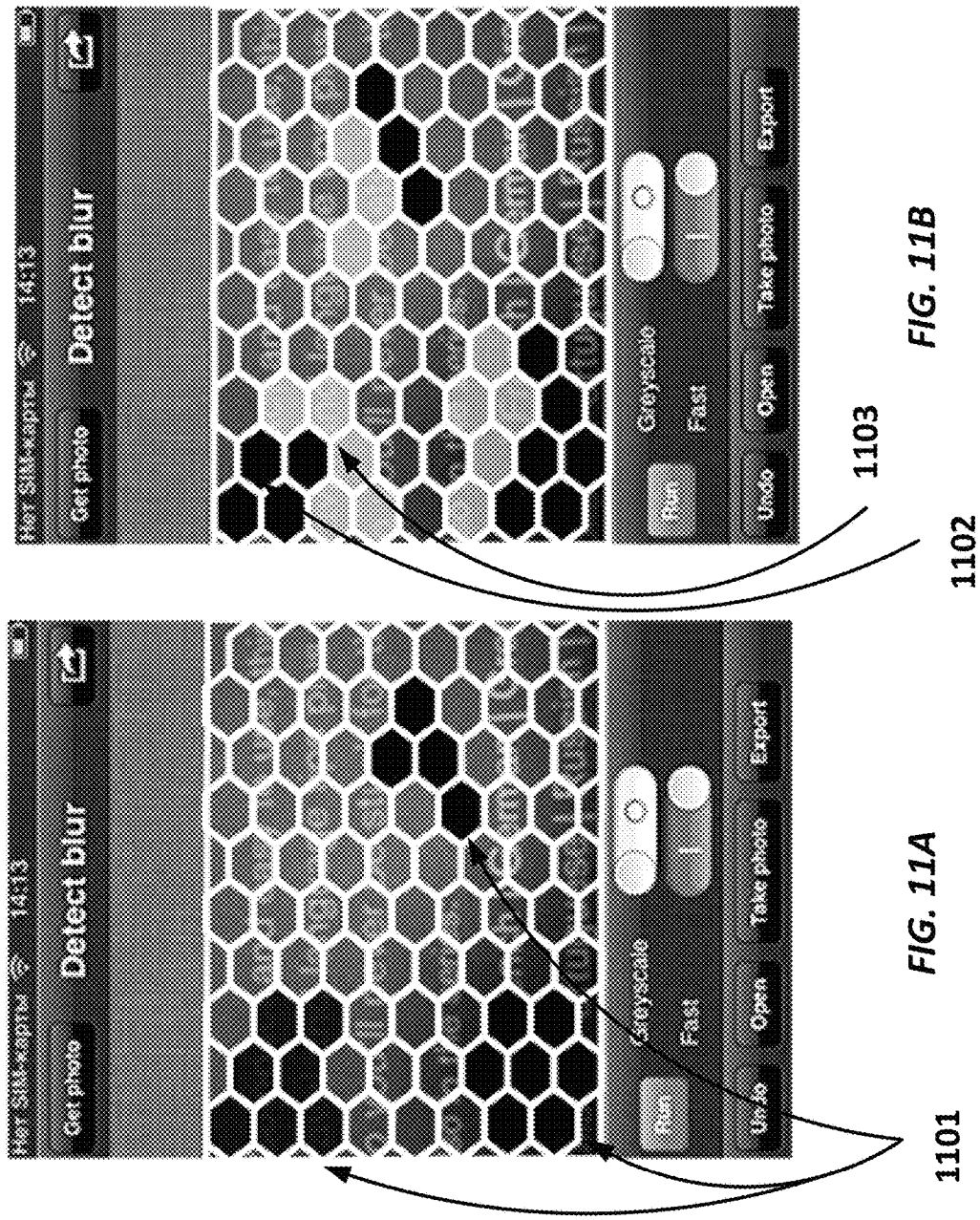
FIGS. 11A, 11B, and 11C show screenshots that include color representation for indicating types and level of detected defects of a frame in accordance with an embodiment of the present disclosure.

As was mentioned above, the grid is very convenient for demonstrating or visually representing the detected defects for a user. For example, the grid can be used to indicate the part of a screen that contains one or more types of defect. In addition, the type of detected defect (blur, defocusing, noise, etc.) can also be communicated via the grid. To distinguish the type of detected defect, each defect may be designated by one or more kinds of signals. One of the possible signals is indicating the type of defects using different colors. In this example, the type of defect in a particular region determines a color used to color that region. For example, filling the regions may be performed in one color (for example black, as shown in FIG. 11A) in the case when the frame contains only one type of the defect. In FIG. 11A, the regions 1101 with defects are filled with black color. Additionally, coloring the regions may be performed using a gradient color that identifies the level of the defect (FIG. 11B). For example intensive 1102 bright color is intended for explicit defects, for example when the text is not readable and it is inadmissible for subsequent OCR, and on the contrary the transparent color 1103 may be used for slightly marked defects.

Figure 11C:
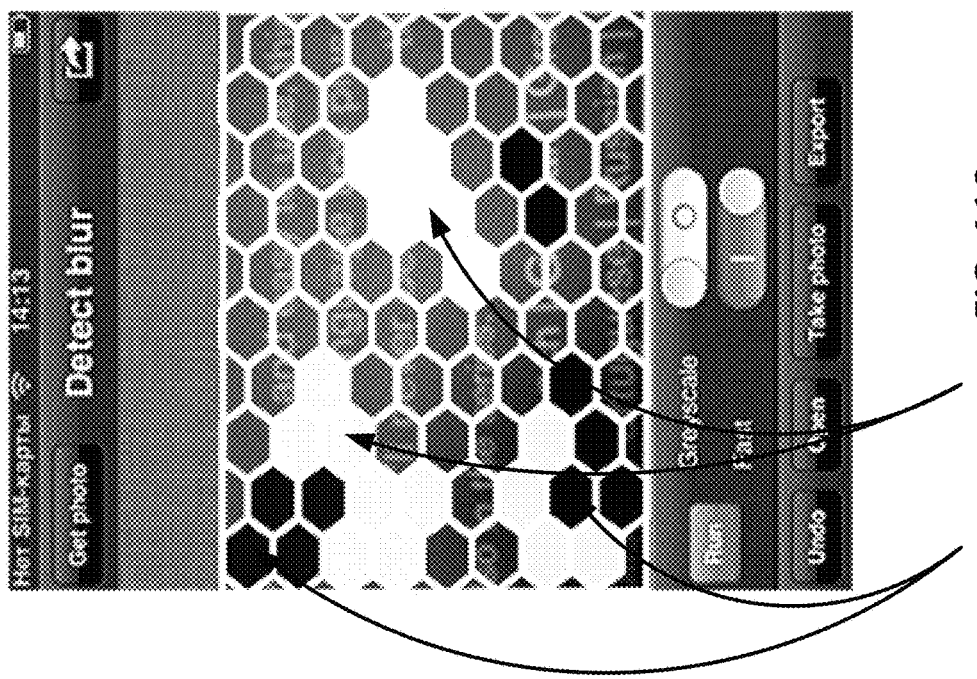

In other embodiments, filling the regions may be performed by using different colors for visualizing the kind of the defect as illustrated in FIG. 11C. In one embodiment, filling a region with black color 1104 illustrates that the region contains a particular detected defect, e.g., blur. Other colors can be used to identify other types of defects. For example, filling a region with white color 1105 illustrates the region contains a different type of defect, e.g., defocused text. Also some color may be used for identifying the parts of a frame that has excellent quality. For example, green color may identify region where there is no defects are detected. In addition, different colors representing different defect types can use gradient coloring to show the level of defect.

The statistics for profiles of the second derivative are gathered separately for each area (205) and are then analyzed (206). The following features may be used: mean value, dispersion, asymmetry coefficient, and other features computed for each parameter of the second derivative profile (e.g., the absolute values of the local maxima and minima, maximum and minimum offset, etc.). Other features may include the number of identified extrema, the ratio of unreliable extrema (for which the position of the maximum or minimum could not be reliably detected), and correlations between the offsets and absolute values of the extrema.

Figure 5B:
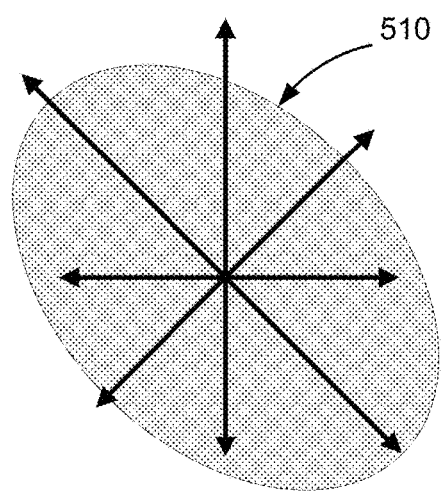
FIG. 5B shows a feature representation as eight vectors (spaced at 45 degrees from each other) and inertia tensor computed for this construct in accordance with an embodiment of the present disclosure.

As statistics can be gathered separately for each specified direction of the gradient, the features (mean value, dispersion, etc.) are also computed separately for each direction. Thus, if eight directions are specified (at multiples of 45 degrees), each feature may be represented as eight vectors (e.g., as shown in FIG. 5B), where the length of each vector corresponds to the value of the feature in its respective direction.

In one embodiment, within operation 206, the features thus obtained may be passed to any trained classifier which will use them to identify the type of distortion and its parameters (207). For example, the mean distance from the zero crossing point to the extrema (i.e., the mean value of the extremum offset) for the second derivative gives an estimate of the strength of the blur—the greater the distance or magnitude, the greater the blur. Besides a classifier may be trained based on results of subsequent recognition (OCR/ICR) of an analyzed frame. For example, a classifier may changes some parameters of blur or defocusing detection based on great amount of false recognized characters.

In another embodiment, within operation 206, the set of vectors may be described by a set of features that are invariant to a shift and rotations, for example, by the mean length of the vector, the vectors stretching in a particular direction. These features may include various image moments (e.g., central moments, Hu set of invariant moments, their combinations, etc.). The computed features are subsequently passed to any trained classifier for further analysis. This approach greatly reduces the dimensions of the feature space handled by the classifier and makes the features more immune to lack of statistics in one or more of the specified directions (for example, if there is not enough edges in a particular direction of the gradient).

As an example, the set of vectors for each feature may be regarded as a construct made up of material points with certain weights at the ends of the vectors. An inertia tensor may be computed for this construct (e.g., 510), which is a combination of central moments of second order. The weights may be selected, for example, as proportionate to the number of reliable extrema in the direction of the vector, or based on any other criteria. In the general case, the weights may be assumed to be equal 1. Next, the features of the inertia tensor are computed, such as the eccentricity and the trace of the matrix of the tensor, which are subsequently analyzed by a classifier.

The features of the inertia tensor may be used to identify, for example, the following distortion features. The eccentricity may indicate either blur or defocusing, as eccentricity values close to 0 are typical of defocusing. The trace of the inertia tensor provides information about the strength of the blur or defocusing. The direction of the blur coincides with the eigenvector of the inertia tensor with the maximum eigenvalue.

Sometimes properties of the image can be revealed using additional data in addition to only eigenvalues of tensor inertia. For example, a Hu set of invariant moments can be used to supplement the set of tensor inertia eigenvalues. As a non-limiting example, Hu invariant moments may be computed in the following manner:

$$I_1 = \mu_{20} + \mu_{02},$$

$$I_2 = (\mu_{20} - \mu_{02})^2 + 4\mu_{11}^2,$$

$$I_3 = (\mu_{30} - 3\mu_{12})^2 + (3\mu_{21} - \mu_{03})^2,$$

-continued $$I_4 = (\mu_{30} + \mu_{12})^2 + (\mu_{21} + \mu_{03})^2,$$

$$I_5 = (\mu_{30} - 3\mu_{12})(\mu_{30} + \mu_{12})[(\mu_{30} + \mu_{12})^2 - 3(\mu_{21} + \mu_{03})^2] +$$
$$(3\mu_{21} - \mu_{03})(\mu_{21} + \mu_{03})[3(\mu_{30} + \mu_{12})^2 - (\mu_{21} + \mu_{03})^2]$$

$$I_6 = (\mu_{20} - \mu_{02})[(\mu_{30} + \mu_{12})^2 - (\mu_{21} + \mu_{03})^2] + 4\mu_{11}(\mu_{30} + \mu_{12})(\mu_{21} + \mu_{03})$$

$$I_7 = (3\mu_{21} - \mu_{03})(\mu_{30} + \mu_{12})[(\mu_{30} + \mu_{12})^2 - 3(\mu_{21} + \mu_{03})^2] -$$
$$(\mu_{30} - 3\mu_{12})(\mu_{21} + \mu_{03})[3(\mu_{30} + \mu_{12})^2 - (\mu_{21} + \mu_{03})^2]$$

$$I_8 = \mu_{11}[(\mu_{30} + \mu_{12})^2 - (\mu_{03} + \mu_{21})^2] - (\mu_{20} - \mu_{02})(\mu_{30} + \mu_{12})(\mu_{03} + \mu_{21}),$$

where $\mu_{ij}$ are central moments. Optionally, in the above described formulas central moments $\mu_{ij}$ may be substituted by their respective normalized value. Normalization can be calculated by the following formula:

$$\mu_{ij\,norm} = \frac{\mu_{i,j}}{\mu_{00}^{\left(1+\frac{i+j}{2}\right)}}$$

Detecting objects of small widths (e.g., thin lines) is a special problem, especially if such objects have small areas or are obscured by noise. The disclosed detector allows adjusting or changing of the parameters of the filter used to obtain the Laplacian-like image. The parameters of the filter may be selected so as to make the edges of the small-width objects more immune to noise and easier to detect.

Establishing the degree of distortion within the image is performed in operation 208. One of the results of distortion detectors running may be, for example, visual representation of distorted areas within a frame displayed on a screen. FIGS. 11A-11C illustrate examples of possible visual representations. Another possible result is showing one or more messages with information about the degree of distortions or with a report about the unsuitability of a frame for further processing. If strong defects are detected within a frame, the message may contain advice for the user to change the conditions of shooting. For example, if some defect is detected within the frame, an area (text), which contains this particular defect, is highlighted in the viewfinder. A certain color of filling may indicate to a user the type of the defect detected in this particular area. For example a yellow color may be a conditioned signal that the blur is detected, whereas red color may indicate a defocusing, etc. The intensity of the fill an area may be indicative of the degree of distortion.

Besides, depending on the type of defect system may provide recommendations to the user to improve the recording conditions. For example, if glare is detected within the frame, the user can receive a message with advice to change the light conditions so as to avoid glare. If the text is blurred, the user can receive a message with advice to stabilize the device before the moment of shooting. If no defects are detected, or defects were negligible (e.g., below a predetermined threshold), the application can automatically take a picture. Also, it is possible that the user may perform a shooting manually.

The disclosed method is noise resistant, making the detector highly reliable. In the case of high levels of noise or low-contrast edges, additional analysis of area statistics may be performed. Additional analysis may also discover complicated defects, for example, those caused by complicated movements of the photographic camera.

The analysis may be performed on the original frame, and on its reduced copies. In the latter case, reducing the image can include smoothing. Smoothing may be performed at the preliminary step, or within the stage of downsampling. Smoothing can reduce noise levels, and the downsampling can improve an algorithm performance.

Noise Detecting

Various embodiments can detect noise in a frame. Noise detection can be performed within the entire image or for one or more regions of the image. Various statistical indicators may be used as a noise measure in areas of image, such as the mean and the variance of luminance in a particular area. The more an area is analyzed, the more accurate and reliable the noise indicator becomes. Based on the results of noise measurements within each of the areas in the frame, it is possible to determine regions that contain a greater noise amount. An amount of noise may depend on specific features of the optical systems, so the noise level may be adjusted or indicated in the device settings.

Noise determination within a frame is related to visual elements of the image. Thus, for example, large letters with large noise content may be readable and recognizable, while small letters with the same noise amount may be unrecognizable and unreadable. When an image is to be used for OCR processing, the noise detection within a frame can be based on a "signal/noise ratio" calculation. This ratio indicates what is the ratio of useful signal to noise level within the frame (or an area of the frame). The higher value of the said ratio, the less noise is present within the frame. If the signal to noise ratio is below a predetermined threshold, a warning message to a user with information about the amount of noise within the current analyzed frame can be displayed. It is also possible to display a message with advice for changing shooting conditions to reduce the noise level within the image or portions of the image.

Glare Detection

Figure 6A:
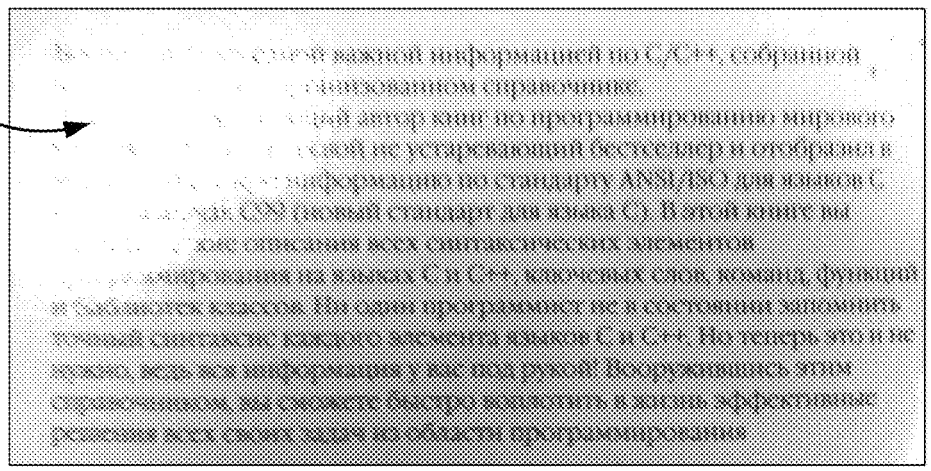
FIG. 6A shows a frame with glare in a screen of a viewfinder in accordance with an embodiment of the present disclosure.
Figure 6B:
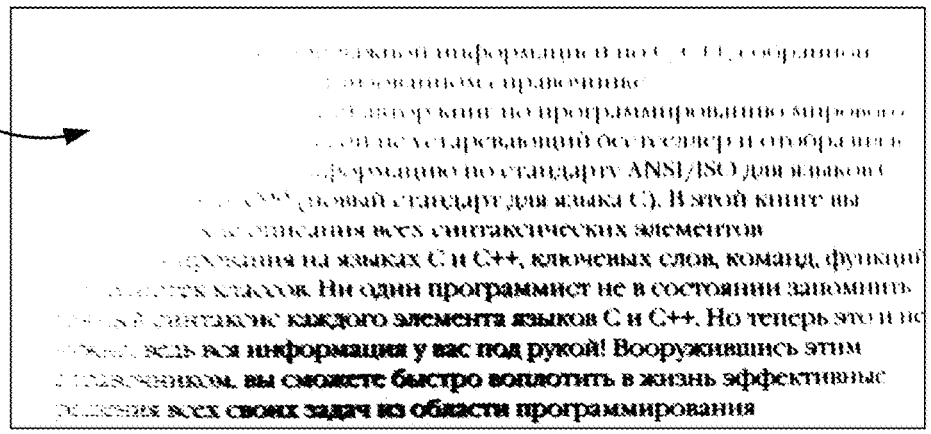
FIG. 6B shows the frame shown in FIG. 6A after being binarized in accordance with an embodiment of the present disclosure.

An example of a frame in a viewfinder with glare (601) is illustrated in FIG. 6A. FIG. 6B shows the frame shown in FIG. 6A after being binarized. FIG. 6B demonstrates that area 602 with glare 601 contains a signal, which is not appropriate for further processing.

Figure 3:
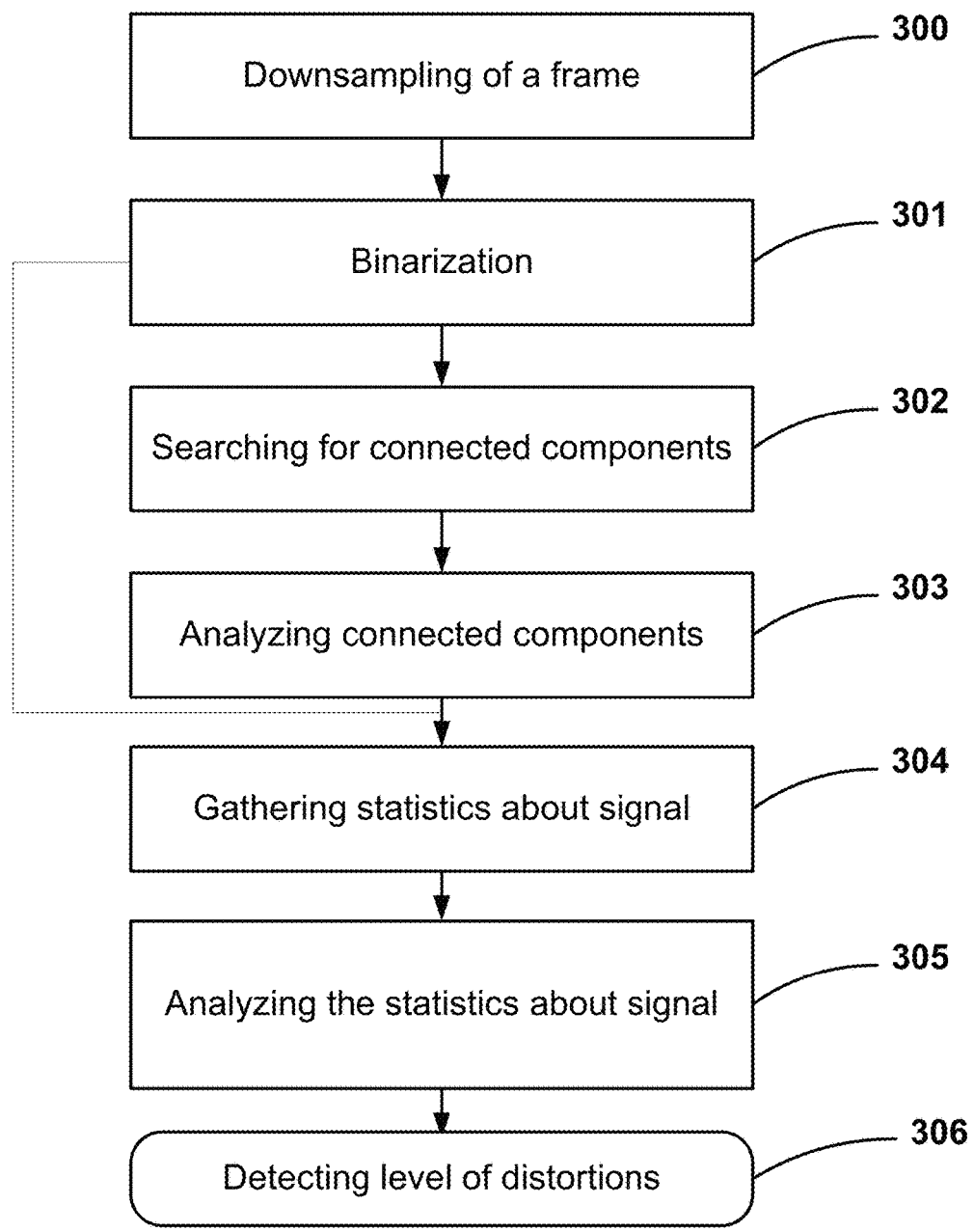
FIG. 3 shows operations for detecting glare in accordance with an embodiment of the present disclosure.

FIG. 3 shows operations for detecting glare in an image in accordance with an embodiment of the present disclosure. At operation 300, an analyzed frame may be downsampled. Downsampling can significantly reduce the time required for performing computing operations, which can be important in performing an analysis of a frame in real time. Frame downsampling may be performed, for example, by sequentially applying a mask as $$[c_1, c_{21}, \ldots, c_{2k+1}] * \frac{1}{\sum c_2}$$

along the vertical and along the horizontal, or by subsequent smoothing and interpolation. For example masks may be represented as $$[121] * \frac{1}{4} \text{ or } [111] * \frac{1}{3}.$$

Smoothing can reduce the amount of noise within the frame.

Figure 7A:
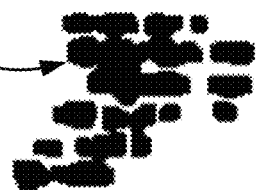
FIGS. 7A and 7B show the results of applying binarization of the frame shown in FIG. 6A with different suboptimal threshold values in accordance with an embodiment of the present disclosure.
Figure 7A:
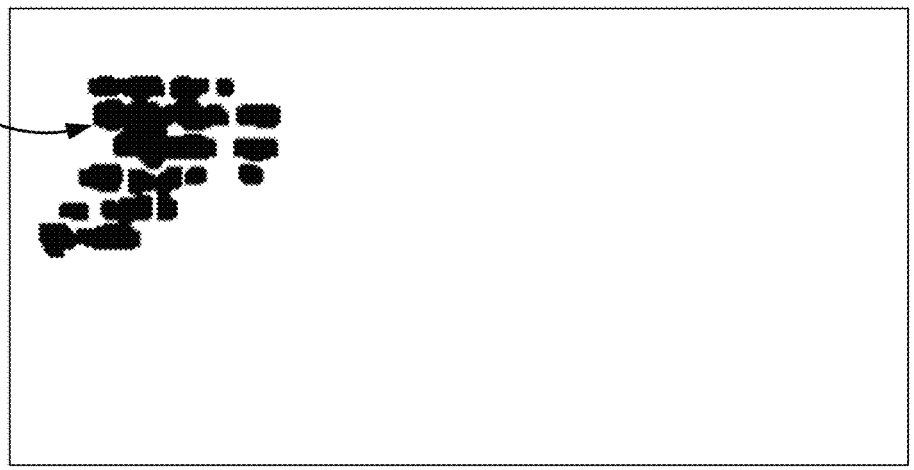
Figure 7B:
Figure 7B:
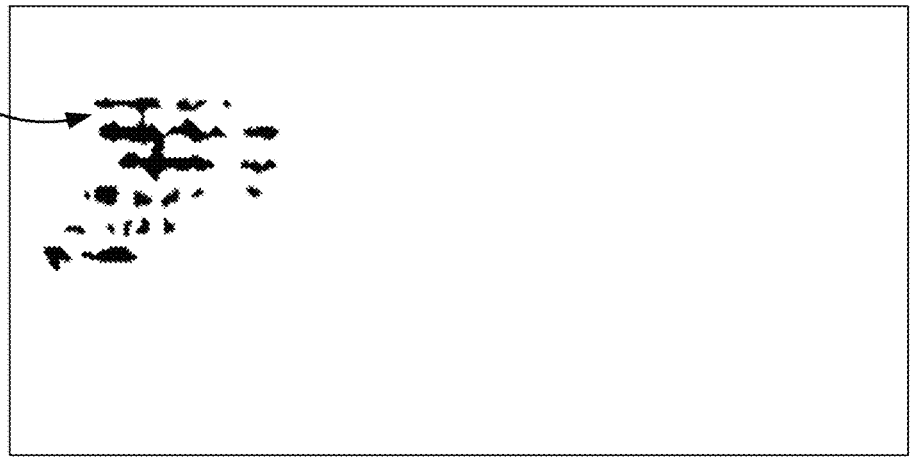

Then the frame can be binarized at some adjusted sub-optimal threshold value in operation 301. For converting the analyzed frame into a binary version, thresholding may be used. For this, some sub-optimal threshold value th of inverted binarization can be specified. For example, a pixel value that is greater than or equal to th is set to value 1 and a pixel value less than th is set to 0. The resulting image is called a binary image because each one of its pixels can only be in one of two states. Other techniques for binarization also may be used. Examples of frames after threshold inverted binarization are illustrated in FIGS. 7A and 7B.

It is assumed that the scene in the viewfinder and shooting conditions from frame-to-frame changes slightly. Accordingly, in some embodiments, the selection of a sub-optimal binarization threshold value for the current series of frames can be based on previously analyzed frames.

When there is insufficient smoothing in an area, the area can be "light spot over text" or glare. The term "light spot over text" is referred to an indication of an overexposed area, where the area contains an edge of brightness drop but the text is readable and recognizable. In regard to glare, the area contains a distorted signal that is inappropriate for future processing. An example of glare is shown in FIGS. 6A and 6B.

The heterogeneity may be revealed in the appearance of small light spots over text within the paper due to its roughness. To avoid the described above drawback, it is possible to increase the smoothing degree. An alternative method is to apply a dilatation operation to a binarized image. Other morphological filters may be also applied. Morphological filter "dilatation" expands the area of a frame by extending the pixels in a frame. As a result, a union of domains occurs in a frame, which could be separated by some noises remaining after smoothing. Dilatation parameters (size and shape) may depend on the preceding steps. Dilatation may be performed, for example, in a 3×3 window.

The search of simply connected regions (components) within the binarized image is performed in operation 302. Identified connected components may be sorted by their size. Sorting of identified connected regions may increase the chance of detecting a "light spot over text" without going through all the found-related components. In addition, connected small components may be excluded to accelerate the glare detection procedure.

In operation 303, each detected simply connected component is examined to determine whether the area covered by the component is a "light spot over text" or not. At this stage, a cascade eliminating connected components may be applied to identify components that are definitely not a glare. This step is useful to avoid resource-intensive phases of data analysis. Thus, for example, those connected components that are not "sufficiently tight" may be not analyzed, i.e. those components which occupy a small part of the area in the image. Thus, white interline intervals and column spacing may be excluded in advance from the following analysis.

In one embodiment of the disclosed invention to determine whether the area covered by the connected component is a "light spot over text" or not, the computed statistics may be applied to some trained classifier. Based on this statistics the trained classifier may make the decision whether the detected connected component (area) is "light spot over text" or not. For example cascading classifiers may be used. For example, several classifiers can be arranged in a cascade, e.g., a degenerated decision tree. In each stage of the cascade, a decision can be made whether the image contains the object or not. A cascading classifier can apply simple features at first stage. The computing of simple features is not resource consuming. Examples of possible features include the ratio of black pixels to the perimeter of a connected component, average intensity, etc. During the next stage if there is a possibility that the analyzed area is a glare, additional features (additional statistics) may be computed. For instance, the additional statistics can include the gradient of intensity along the perimeter that also may be computed. These additional statistics can be used by one or more stages of the cascading classifiers. Also one or more of the classifiers may be trained based on the results of recognition of a frame (image). For example, a classifier may change the parameters of glare detection based on the amount of the uncertainty recognized characters. Based on the recognition results one or more classifiers may be trained.

Furthermore resource consuming operations may be performed and more complex statistics may be computed. For example, operations for checking the detected area on the subject of whether this area is "light spot over text" follows. Detected connected areas are approximated with an ellipsoid of inertia. The formula of a quadratic form of an ellipse can then be applied.

Figure 8:
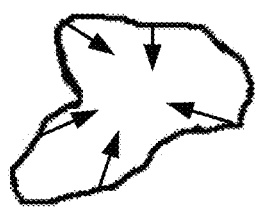
FIG. 8 shows a connected component, an example of glare, where gradient is directed in the center in accordance with an embodiment of the present disclosure.

Along the edge of binarized simply connected area (or other approximated figures) statistics of directions and values of gradients of intensity based on the initial frame are gathered. If the direction of the brightness gradient is directed almost everywhere to the center of a spot (as shown in FIG. 8), and its value is on average more than a certain threshold, then the region is recognized as a "light spot over text." So, statistics for some properties of the ellipse and its smaller version are collected and analyzed to test the detected area. For example, the number of supporting and rejecting the brightness fluctuations on the circuit around the spot, statistics for the sample on the contour of the ellipse of scalar products of the brightness gradient and the unit vector from point to center, and statistics of pixels brightness along the boundaries of the ellipses can be collected and analyzed. Analysis of other additional data and collection of additional statistics gathered in a circle of smaller radius can help to better classify the absence or presence of "light spot over text".

If at operation 303, the area is not considered to be lighted, the next suboptimal threshold value of binarization is selected. Then the image is analyzed again searching for "light spot over text" areas. The process of selecting an optimal threshold of binarization and "light spot over text" detection at this value of binarization is iterative and repeated until the "light spot over text" are either found inside a frame or a decision is made that the "light spot over text" is missing. To calculate the threshold values may be used following formula:

$$th_{i} = th_{i-1} * k$$

Where $th_i$ is a threshold value at the step i of binarization, $th_{i-1}$ is a threshold value at the step (i-1) of binarization, k is a coefficient.

It is assumed that the scene in a viewfinder and the conditions of a shooting from a frame to frame change. Accordingly, the selection of an optimal parameter of binarization for a current series of frames can be based on the previously analyzed frames. Thus the optimal threshold value of binarization at a certain step i, at which "light spot over text" were found in an image can be stored and applied to the next frame in a series of frames. This procedure helps to noticeably shorten the amount of time needed to analyze frames in video sequence. Results of different binarization threshold values for detecting a "light spot over text" in the original image are illustrated in FIG. 7A, 7B. Moreover, FIG. 7A illustrates the result of binarized images with less suboptimal threshold, resulting in a simply connected region 701 that has a larger area compared to the area 702 shown in FIG. 7B, where a higher suboptimal binarization threshold was used.

Statistics about the signal in the overlighted area can be collected separately in operation 304. Example statistics include calculating a signal to noise ratio for the regions in the overlighted area. The signal to noise ratio can also be calculated in related regions, e.g., regions near the overlighted area. As an example, the regions surrounding the overlighted area can be used. The signal to noise ratio of the regions in the overlighted area can then be compared to the signal to noise ratio of one or more of the related regions in operation 305. If the indicator "signal/noise ratio" is significantly lower in the regions containing a simply connected region, this area is considered glare, not just an overlighted area. This indicates that the information in the distorted area includes a signal which is unsuitable for further recognition. The calculated "signal/noise ratio" can also be used for blur and defocusing detection.

In addition, at this step the obtained features may be passed to any trained classifier which will use them to identify the glare presence and its parameters. Classifier may be trained based on users interacting with an electronic device. For example, GUI functions related to training may be turned on allowing a user an opportunity to train a classifier during the detectors run. For example, the user may have an opportunity to mark manually, correct or change type or areas of defects within the frame.

Figure 12:
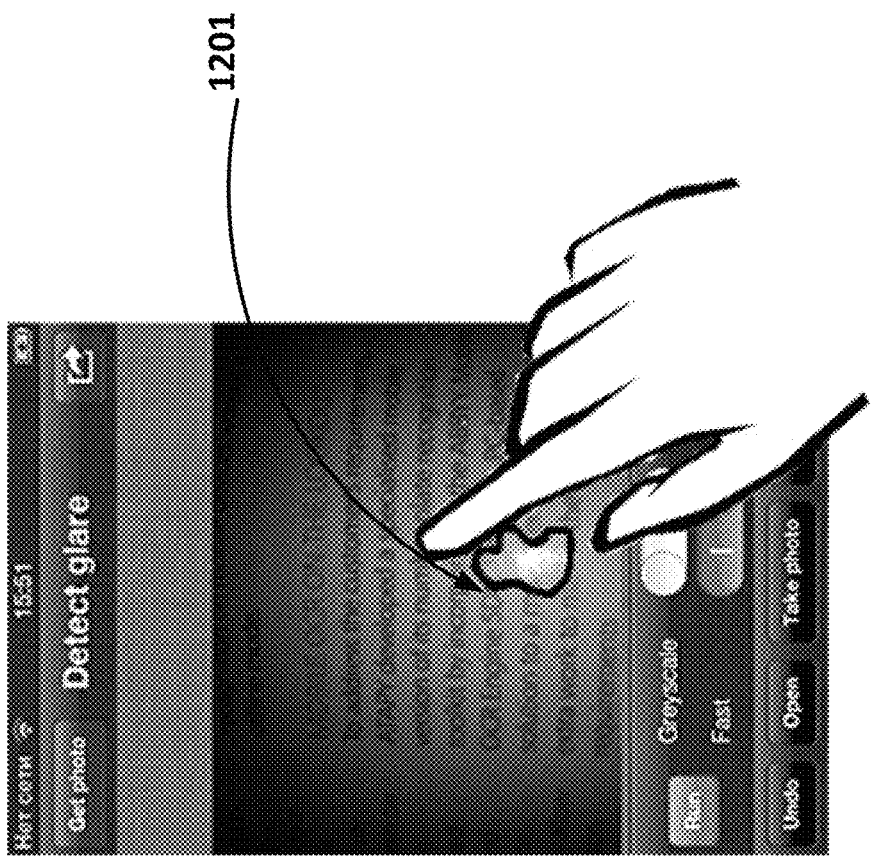
FIG. 12 shows a line around detected glare within a frame and allows the boundary of the defect to be adjusted in accordance with an embodiment of the present disclosure.

In FIG. 12, the example of the line 1201 that highlights the glare is illustrated. The line describing the detected glare may be displayed on the screen for user. This line represents a visual signal to a user indicating a defect in a frame. If, in according to the user's opinion, the glare boundaries are different, for example, the line covers a larger (or smaller area), the system allows the user to manually change the boundaries of the defect (FIG. 12). Also user may cancel the line or mark an area as a defect if detectors failed to determine a defect. Adjustments of this type allow a user to train the classifier, thereby significantly improving the quality of defect detection, such as glare detection, in subsequent frames. One of the known training algorithms may be used for mentioned above goals.

In addition, a classifier may be trained based on results of subsequent recognition (OCR/ICR) of an analyzed frame. For example, a classifier may changes some parameters of glare detection based on great amount of false recognized characters from OCR recognition.

Specifically statistics about incorrectly or uncertainly recognized characters within each of the areas within the frame (image) can be computed. For example, image data can be sent to remove computing that device that uses OCR to determine text contained within the image data. In an alternative embodiment, OCR can be done locally on the electronic device. Based upon the OCR process, data indicating the recognized characters and the amount of incorrectly or unrecognized characters can be received. If the level of incorrectly or uncertainly recognized characters exceeds some preliminary determined threshold value for an area within the frame, the area within the frame can be determined to have a defect. In addition, this information can be used to train a classifier used to detect the defects. For example, a hypothesis $H_0$ about the presence of the defect can be formulated based upon the level of incorrectly or uncertainly recognized characters exceeds some preliminary determined threshold value. Threshold value h may be determined by user or can be a default value associated with the electronic device. If the formulated hypothesis $H_0$ is confirmed by the computed statistics in the area, the classifier can be trained. So, for example, if the detector has not found a defect in the area, when recognition results comprise a large number of false or uncertain characters that indicates that the classifier should be trained more. One of the known training algorithms may be used for mentioned above goals.

If degree of distortion (306) of a frame does not exceed some predetermined by user (default or specified in the device) threshold value, the capturing of the image may be accomplished. In one of the ways the recording may be accomplished automatically by an electronic device. In an alternative method of performing a record may be accomplished manually by user.

If one of the areas contains a defect, a set of possible actions may be suggested for user. These suggestions can include advice via the GUI of the electronic device in form of written or audio messages. These messages can include instructions for changing one or more shooting conditions or settings to receive an image with better quality.

If the detected defect is a noise, possible actions include:
applying one of noise-suppressing algorithms; or
changing quality of light conditions.

If the detected defect is a blur or defocusing, so possible actions are:
applying specific algorithm for restoration blurred of defocused image. One of the method is described with details in U.S. patent application Ser. No. 13/305,768 filed on 29 Nov. 2011 and initially titled Detecting and Correcting Blur and Defocusing, which is incorporated by reference herein in its entirety;
changing light conditions; or
applying one of the algorithms for stabilization a device or algorithm for capturing a frame in the moment of stabilization of a device. One of the methods is described with details in U.S. patent application Ser. No. 13/658,967 filed on 24 Oct. 2012 and initially titled Capturing Images after Sufficient Stabilization of a Device, which is incorporated by reference herein in its entirety.

If the detected defect is a glare, so possible actions are:
changing an angle of captured object relative to camera/or light sources; or
changing light conditions to avoid subdued light.

The possible actions are not limited by the mentioned above advices. Other messages or actions may be suggested for user. Instructions regarding a suggested action or advice may be represented in form of messages on the screen of electronic device. In cases where there are several defects within an analyzed frame, multiple instructions or advice may be combined in accordance with the detected defects within a frame. In addition, algorithmic algorithms can be run to alter the image data that contains the defect. This altered image data can be displayed to the user. For example, the user can be prompted to accept the changes made by the selected algorithm.

In some embodiments, overshadowed areas within the image can be detected. In some embodiments, detecting overshadowed areas can be combined with detecting over lighted areas. The consequence of operations in detecting overshadowed areas is the same compared to detecting overlighted areas. A main difference consists in applying the algorithm to an inverted frame. This step is included in the stage of binarization. So specifically parameters for the binarization should be set accordingly.

The detection of possible defects within the frame (current view) may be performed by applying all the described detectors simultaneously or in sequence. This allows the detection of various different defects within the frame. Because the frame may contain several types of defects, for example the frame may be blurred with high level of noise and glares, the results of multiple detectors can be integrated together. For example, a weighted level of defect can be determined based upon each individual defect. So the analyzed frame is checked on the presence of two or more defects. Within the screen various visual representations of the defects may be displayed for user as described above. In another embodiment, the results of individual detectors can be shown. In yet another embodiment, each detector is applied separately. For example, it may be useful when user is interested in analyzing the frame only for one kind of the defects, for example for glare, noise or blur, etc.

As described above, an image can be captured when the degree of one or more distortions in a frame is below a predetermined threshold. In another embodiment, the frame may be selected from a current video sequence with a minimum level of distortion or, at least with a level of distortion that does not exceed some certain threshold value. For example, each frame of a video sequence can be analyzed for one or more distortions as described above. The frame with the smallest distortion or at least with distortions below a threshold can be selected and stored in a memory of an electronic device. Further, subsequent frames in a video sequence can be analyzed for defects based on the methods described above, and also compared with stored frames. Thus, if at a later time (t+1), the analyzed frame has fewer defects as compared with already stored in the frame memory from time (t), the frame (t+1) can be stored in place of the previous frame (t) in memory.

In an alternative embodiment, selection and analysis of a frame may be performed in non-realtime. For example, video with documents may be recorded and then at a later time the video can be analyzed. As an example, one or more frames that include documents may be extracted from the video and analyzed. The video can be stored in memory storage (604) of an electronic device or from other external sources, for instance from the Internet, memory cards, or may be downloaded from other electronic devices by Bluetooth, etc.

Figure 13:
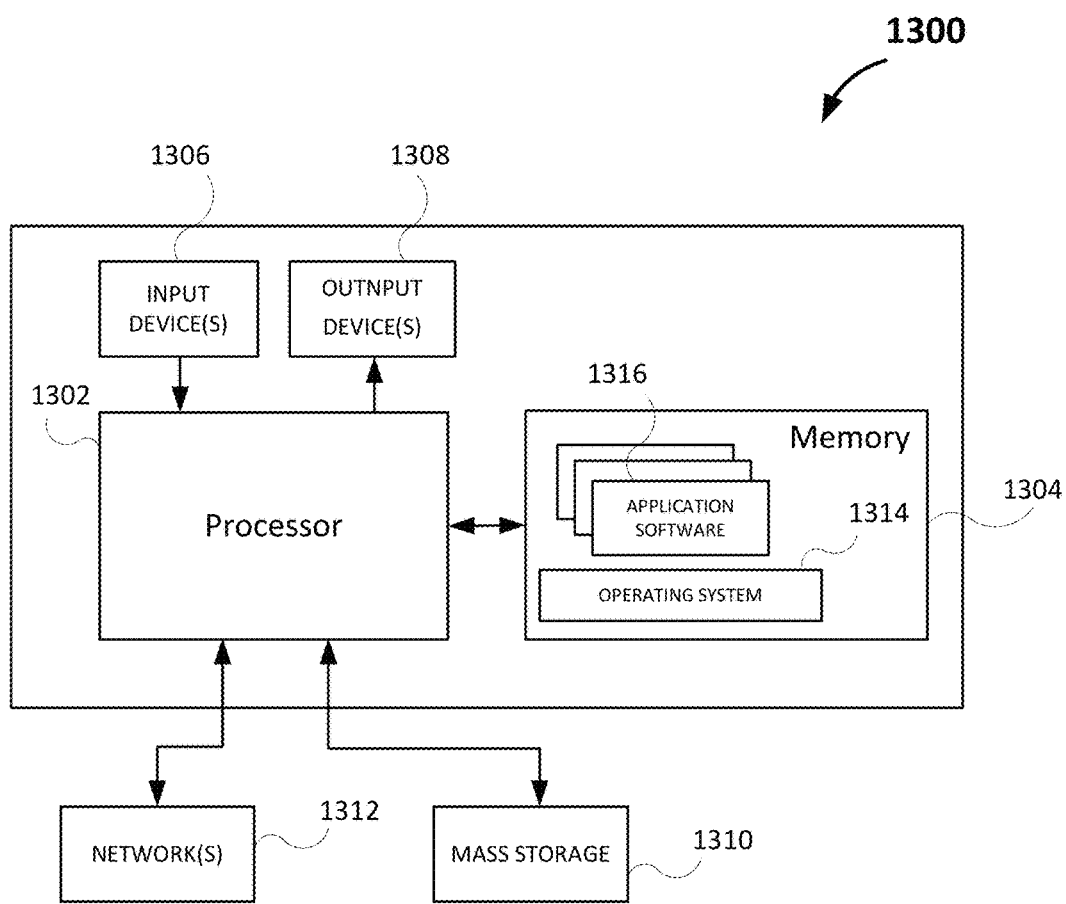
FIG. 13 shows one example of a hardware or device for implementing the techniques described herein.

FIG. 13 shows hardware 1300 that may be used to implement the electronic device 102 in accordance with one embodiment. Referring to FIG. 13, the hardware 1300 typically includes at least one processor 1302 coupled to a memory 904 and having touch screen among output devices 1308 which in this case is serves also as an input device 1306. The processor 1302 may be any commercially available CPU. The processor 1302 may represent one or more processors (e.g., microprocessors), and the memory 1304 may represent random access memory (RAM) devices comprising a main storage of the hardware 1300, as well as any supplemental levels of memory, e.g., cache memories, non-volatile or back-up memories (e.g., programmable or flash memories), read-only memories, etc. In addition, the memory 1304 may be considered to include memory storage physically located elsewhere in the hardware 1300, e.g., any cache memory in the processor 1302 as well as any storage capacity used as a virtual memory, e.g., as stored on a mass storage device 1310.

The hardware 1300 also typically receives a number of inputs and outputs for communicating information externally. For interface with a user or operator, the hardware 1300 usually includes one or more user input devices 1306 (e.g., a keyboard, a mouse, imaging device, scanner, etc.) and a one or more output devices 1308 (e.g., a Liquid Crystal Display (LCD) panel, a sound playback device (speaker). To embody various embodiments, the hardware 1300 must include at least one touch screen device (for example, a touch screen), an interactive whiteboard or any other device which allows the user to interact with a computer by touching areas on the screen. The keyboard is not obligatory in various disclosed embodiments.

For additional storage, the hardware 1300 may also include one or more mass storage devices 1310, e.g., floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the hardware 1300 may include an interface with one or more networks 1312 (e.g., a local area network (LAN), a wide area network (WAN), a wireless network, and/or the Internet among others) to permit the communication of information with other computers coupled to the networks. It should be appreciated that the hardware 1300 typically includes suitable analog and/or digital interfaces between the processor 1302 and each of the components 1304, 1306, 1308, and 1312 as is well known in the art.

The hardware 1300 operates under the control of an operating system 1314, and executes various computer software applications 1316, components, programs, objects, modules, etc. to implement the techniques described above. In particular, the computer software applications will include the client dictionary application and also other installed applications for displaying text and/or text image content such a word processor, dedicated e-book reader, etc., in the case of the user device 102. Moreover, various applications, components, programs, objects, etc., collectively indicated by reference 1316 in FIG. 13, may also execute on one or more processors in another computer coupled to the hardware 1300 via a network 1312, e.g., in a distributed computing environment, whereby the processing required to implement the functions of a computer program may be allocated to multiple computers over a network.

In general, the routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements of disclosed embodiments. Moreover, various embodiments have been described in the context of fully functioning computers and computer systems, those skilled in the art will appreciate that the various embodiments are capable of being distributed as a program product in a variety of forms, and that this applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

In the above description numerous specific details are set forth for purposes of explanation. It will be apparent, however, to one skilled in the art that these specific details are merely examples. In other instances, structures and devices are shown only in block diagram form in order to avoid obscuring the teachings.

Reference in this specification to "one embodiment" or "an embodiment" means that a particular feature, structure, or characteristic described in connection with the embodiment is included in at least one embodiment. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

While certain exemplary embodiments have been described and shown in the accompanying drawings, it is to be understood that such embodiments are merely illustrative and not restrictive of the disclosed embodiments and that these embodiments are not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

What is claimed is:

1. A method for detecting glare in a frame of image data, the method comprising:
   preprocessing the frame of the image data;
   determining a set of connected components in the preprocessed frame;
   calculating a set of statistics for one or more connected components in the set of connected components, wherein calculating the set of statistics comprises gathering statistics of directions and values of gradients of intensity along a perimeter of a connected component of the one or more connected components;
   making a decision for the one or more connected components, using the calculated set of statistics, if the connected component is a light spot; and
   determining, using a processor, whether the frame comprises the glare in view of the decision for the one or more connected components.

2. The method of claim 1, wherein the preprocessing of the frame comprises binarizing the frame, wherein the frame is binarized based upon a threshold value.

3. The method of claim 2, wherein the threshold value is adjusted based on a previously analyzed frame of image data in an iterative manner.

4. The method of claim 1, wherein the calculating the set of statistics is performed at once for all of the connected components.

5. The method of claim 1, wherein the calculating the set of statistics is performed in an iterative manner until all glares are detected in the frame.

6. The method of claim 1, wherein the making the decision further comprises removing from further consideration all light spot connected components, wherein light spots connected components contain a recognizable signal.

7. The method of claim 1, wherein the set of statistics comprises one of a ratio of black pixels to a number of pixels of a perimeter of the connected component or an average intensity of the connected component.

8. The method of claim 1, further comprising:
   sorting the set of connected components based upon a size of the components; and excluding connect components less than a predetermined size from the set of connected components.

9. The method of claim 5, wherein the calculating the set of statistics further comprising:
determining a second set of statistics for one or more of the connected components that remain in the set of connected components after removing from further consideration all light spot connected components based upon the decision making; and
determining for each of the one or more of the connected components, using a trained classifier and the calculated second set of statistics, if the one or more of the connected components is a light spot.

10. The method of claim 1, wherein the frame of image data comprises a frame of a video sequence.

11. The method of claim 1, wherein the preprocessing of the frame comprises downsampling an analyzed frame.

12. The method of claim 11, wherein the downsampling is performed by sequentially applying a mask, or by subsequent smoothing and interpolation.

13. The method of claim 1, wherein the preprocessing of the frame comprises applying morphological filter, wherein the morphological filter increases a smoothing degree.

14. The method of claim 1, wherein the decision making comprises applying a trained classifier.

15. The method of claim 1, further comprising approximating the one or more connected components within an ellipsoid of inertia, wherein statistics for some properties of the ellipse and its smaller version is calculated.

16. The method of claim 15, wherein calculating the set of statistics from some properties of the ellipse and its smaller version comprises collecting and analyzing a number of supporting and rejecting brightness fluctuations on a circuit around the spot, statistics for a sample on a contour of an ellipse of scalar products of a brightness gradient and a unit vector from point to center, and statistics of pixels brightness along boundaries of the ellipses.

17. The method of claim 1, further comprising using for training a classifier for information about an amount of incorrect or uncertain recognized characters from OCR recognition.

18. The method of claim 1, further comprising suggesting for user a set of possible actions, wherein possible actions include instructions for changing one or more shooting conditions or settings to receive an image with better quality.

19. The method of claim 1, further comprising:
segmenting the frame into regions of image data;
determining for a connected component a first set of regions of image data that contain this connected component;
determining a third set of statistics based upon regions in the first set of regions for the connected component;
determining a related statistic based upon one or more regions of the image data related to the first set of regions for the connected component; and
comparing the third set of statistics to the related statistic determined therein.

20. The method of claim 19, wherein the third set of statistics is a signal-to-noise ratio of the regions in the first set of regions for the connected component, and wherein the related statistic is a signal-to-noise ratio of the one or more regions related to the regions in the first set of regions containing the connected component.

21. The method of claim 20, wherein the glare is determined to be present in the regions in the first set of regions for the connected component when the signal-to-noise ratio of the first set of regions for the connected component is more than a predetermined amount less than the signal-to-noise ratio of the one or more related regions of the image data.

22. The method of claim 21, further comprising determining the one or more regions of the image data by selecting regions surrounding the regions in the first set of regions.

23. The method of claim 1, further comprising:
determining an area of detected glare in the frame;
altering the frame to visually represent the area of detected glare;
displaying the altered frame;
receiving input from a graphical user interface that changes the area of the glare; and
updating parameters of a classifier to detect glare based upon the received input.

24. The method of claim 23, wherein the area of the detected glare is shown as a line representing a boundary of the detected glare.

25. The method of claim 23, wherein the area of the detected glare is enlarged based upon the received input.

26. The method of claim 23, wherein the area of the detected glare is reduced based upon the received input.

27. The method of claim 1, further comprising:
determining a message corresponding to detected glare to reduce or correct the detected glare; and
displaying the message.

28. The method of claim 1, further comprising:
determining a level of defects within the frame based upon an analyzing of regions of image data to determine types of defects contained within the regions of image data;
determining the level of defects within the frame is below a predetermined threshold; and
saving the frame in long term memory based upon the determining the level of defects within the frame is below a predetermined threshold.

29. The method of claim 1, wherein detecting glare in a frame of image data is performed for a second preprocessed frame.

30. A system to detect glare in a frame of image data, the system comprising:
one or more processors configured to:
preprocess the frame of the image data;
determine a set of connected components in the preprocessed frame;
calculate a set of statistics for one or more connected components in the set of connected components, wherein to calculate the set of statistics, the one or more processors are to gather statistics of directions and values of gradients of intensity along a perimeter of a connected component of the one or more connected components;
make a decision for the one or more connected components, using the calculated set of statistics, if the connected component is a light spot; and
determine whether the frame comprises the glare in view of the decision for the one or more connected components.

31. The system of claim 30, wherein the set of statistics comprises one of a ratio of black pixels to a number of pixels of a perimeter of the connected component or an average intensity of the connected component.

32. The system of claim 30, wherein the one or more processors are further configured to:
sort the set of connected components based upon a size of the components; and exclude connect components less than a predetermined size from the set of connected components.

33. The system of claim 30, wherein the frame of image data comprises a frame of a video sequence.

34. A non-transitory computer-readable medium having instructions stored thereon to detect glare in a frame of image data, the instructions comprising:
- instructions to preprocess the frame of the image data;
- instructions to determine a set of connected components in the preprocessed frame;
- instructions to calculate a set of statistics for one or more connected components in the set of connected components, wherein the instructions to calculate the set of statistics comprise instructions to gather statistics of directions and values of gradients of intensity along a perimeter of a connected component of the one or more connected components;
- instructions to make a decision for the one or more connected components, using the calculated set of statistics, if the connected component is a light spot; and
- instructions to determine whether the frame comprises the glare in view of the decision for the one or more connected components.

35. The non-transitory computer-readable medium of claim 34, wherein the set of statistics comprises one of a ratio of black pixels to a number of pixels of a perimeter of the connected component or an average intensity of the connected component.

36. The non-transitory computer-readable medium of claim 34, wherein the instructions further comprising:
- instructions to sort the set of connected components based upon a size of the components; and
- instructions to exclude connect components less than a predetermined size from the set of connected components.

37. The non-transitory computer-readable medium of claim 34, wherein the frame of image data comprises a frame of a video sequence.

* * * * *